(12) United States Patent
Jongmans et al.

(10) Patent No.: US 10,779,473 B2
(45) Date of Patent: Sep. 22, 2020

(54) HARVESTER HEADER SUPPORT

(71) Applicant: CNH Industrial America LLC, New Holland, PA (US)

(72) Inventors: Dré W. J. Jongmans, AG Klundert (NL); Bart M. A. Missotten, Herent (BE); Frederik Tallir, Esen (BE); Pieter Van Overschelde, Sint-Andries (BE); Rik Vandendriessche, Eernegem (BE); Yvan C. C. Vandergucht, Lo-Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 97 days.

(21) Appl. No.: 15/955,881

(22) Filed: Apr. 18, 2018

(65) Prior Publication Data
US 2019/0320585 A1    Oct. 24, 2019

(51) Int. Cl.
*A01D 75/00* (2006.01)
*A01D 67/00* (2006.01)
*A01D 41/14* (2006.01)

(52) U.S. Cl.
CPC .......... *A01D 75/002* (2013.01); *A01D 41/14* (2013.01); *A01D 67/00* (2013.01)

(58) Field of Classification Search
CPC ....... A01B 73/005; A01B 73/00; A01B 63/22; A01B 63/002; A01B 63/16; A01D 75/002; A01D 41/14; A01D 67/00; A01D 75/004

See application file for complete search history.

(56) References Cited

U.S. PATENT DOCUMENTS

| | | | | |
|---|---|---|---|---|
| 3,228,484 A | * | 1/1966 | Arnold | A01B 3/46 172/400 |
| 4,084,394 A | | 4/1978 | van der Lely | |
| 4,253,528 A | * | 3/1981 | Sullivan | A01B 15/00 172/386 |
| 4,442,662 A | * | 4/1984 | Jennings | A01B 73/005 172/625 |
| 4,831,814 A | * | 5/1989 | Frisk | A01B 73/005 56/181 |

(Continued)

FOREIGN PATENT DOCUMENTS

| | | |
|---|---|---|
| DE | 102008044486 A1 | 4/2009 |
| EP | 1394021 A1 | 3/2004 |

(Continued)

*Primary Examiner* — Arpad Fabian-Kovacs
(74) *Attorney, Agent, or Firm* — Peter Zacharias; Patrick Sheldrake

(57) ABSTRACT

A harvester header support for supporting a header of an agricultural harvester, having a forward travel mode and a rearward travel mode. In the forward travel mode a first coupling element is in a forward travel position relative to a second coupling element, and in the rearward travel mode the first coupling element is in a rearward travel position relative to the second coupling element, wherein the first coupling element is moveable from the forward travel position to the rearward travel position and/or vice versa by pivoting the first coupling element relative to the second coupling element about the first pivot axis. An agricultural harvester having the harvester header support and a method for operating the agricultural harvester are disclosed as well.

18 Claims, 7 Drawing Sheets

(56) References Cited

U.S. PATENT DOCUMENTS

| | | | | |
|---|---|---|---|---|
| 4,986,064 | A * | 1/1991 | Ermacora | A01D 75/002 280/415.1 |
| 5,136,828 | A * | 8/1992 | Ermacora | A01B 63/00 280/43.23 |
| 5,357,737 | A * | 10/1994 | Ermacora | A01D 43/105 56/13.6 |
| 5,562,167 | A * | 10/1996 | Honey | A01B 73/00 16/18 R |
| 5,641,026 | A * | 6/1997 | Balmer | A01B 35/04 172/286 |
| 5,664,796 | A * | 9/1997 | Huyzers | B60D 1/07 254/333 |
| 6,152,240 | A * | 11/2000 | Nonhoff | A01B 73/00 172/311 |
| 6,336,313 | B1 * | 1/2002 | Bonnewitz | A01B 73/00 172/456 |
| 6,666,010 | B2 * | 12/2003 | Beaufort | A01B 73/00 172/395 |
| 6,789,379 | B2 | 9/2004 | Heidjann et al. | |
| 6,843,046 | B2 | 1/2005 | Heidjann et al. | |
| 6,907,719 | B2 * | 6/2005 | Ligouy | A01B 73/005 56/15.1 |
| 7,036,604 | B2 * | 5/2006 | Steinlage | A01B 63/22 172/443 |
| 7,200,981 | B2 | 4/2007 | Heidjann et al. | |
| 7,926,249 | B1 * | 4/2011 | Cook | A01B 73/005 172/240 |
| 8,025,312 | B1 * | 9/2011 | Honas | A01D 75/002 280/769 |
| 8,079,425 | B1 * | 12/2011 | Van Kooten | A01B 63/22 172/133 |
| 8,910,726 | B2 * | 12/2014 | Lammerant | A01D 89/004 172/240 |
| 9,125,343 | B2 * | 9/2015 | Duquesne | A01D 41/16 |
| 9,386,748 | B2 * | 7/2016 | Cook | A01D 75/004 |
| 9,526,204 | B2 * | 12/2016 | Rude | A01D 34/00 |
| 9,565,800 | B2 * | 2/2017 | Fay, II | A01D 43/06 |
| 9,596,808 | B2 * | 3/2017 | Fay, II | A01D 75/004 |
| 9,603,306 | B2 * | 3/2017 | Fay, II | A01B 73/005 |
| 9,622,404 | B2 * | 4/2017 | Harkcom | A01D 34/00 |
| 9,745,714 | B2 * | 8/2017 | Lubbers | E02F 3/6463 |
| 2006/0150605 | A1 * | 7/2006 | Wubbels | A01D 75/00 56/15.8 |
| 2013/0284467 | A1 * | 10/2013 | Snider | A01B 63/22 172/328 |

FOREIGN PATENT DOCUMENTS

| | | |
|---|---|---|
| EP | 1674306 A2 | 6/2006 |
| EP | 2868185 A1 | 5/2015 |
| FR | 3023675 A1 | 1/2016 |

\* cited by examiner

HARVESTER HEADER SUPPORT

FIELD OF THE INVENTION

The invention pertains to a harvester header support, an agricultural harvester comprising a harvester header support and a method for operating an agricultural harvester comprising a harvester header support.

BACKGROUND OF THE INVENTION

Modern agricultural harvesters, such as combine harvesters and forage harvesters, are heavy pieces of machinery, which in many cases have to travel over public roads from one field to another. In many countries regulations exist that prescribe a maximum axle load for vehicles travelling on public roads. The current developments in agricultural harvesters lead to an increase of the axle loads of these harvesters. In particular when a header is attached to the agricultural harvester during road transport, the front axle load can reach levels which are close to or even above the maximum allowable axle load for public roads.

It is known from the prior art to provide one or more support wheels on the front parts of the agricultural harvester. These support wheels are generally connected to the header or to the feeder of the agricultural harvester.

EP2868185 discloses an auxiliary axle for an agricultural harvester during road transport. This known device is quite complicated, comprising an extensive control system to ensure a constant downforce between the axle assembly and the ground surface.

SUMMARY OF THE INVENTION

It is the object of the invention to provide an improved harvester header support.

According to the invention, this object is achieved with a harvester header support for supporting a header of an agricultural harvester, which harvester header support comprises:

a frame, which frame comprises a harvester interface, which is connectable to an agricultural harvester, a first support wheel, which is rotatable about a first support wheel axis, which first support wheel is mounted on a first support wheel shaft, a coupling device, which is adapted to couple the first support wheel to the frame, which coupling device comprises:

a first coupling element, which is connected to the first support wheel shaft, and a second coupling element, which is connected to the frame and to the first coupling element, the first and second coupling element being pivotable relative to each other over a pivot angle and about a first pivot axis, which first pivot axis extends at a distance from and substantially parallel to the first support wheel axis, wherein the coupling device has a forward travel mode and a rearward travel mode, in which forward travel mode the first coupling element is in a forward travel position relative to the second coupling element, and in which rearward travel mode the first coupling element is in a rearward travel position relative to the second coupling element, wherein the first coupling element is moveable from the forward travel position to the rearward travel position and/or vice versa by pivoting the first coupling element relative to the second coupling element about the first pivot axis.

According to the invention, the harvester header support comprises a frame. The frame comprises a harvester interface, which is connectable to an agricultural harvester, for example to the header and/or to the feeder of the agricultural harvester.

The harvester header support further comprises a first support wheel, which is rotatable about a first support wheel axis. The first support wheel is mounted on a first support wheel shaft. The first support wheel shaft is for example a stationary shaft about which the first support wheel rotates. Alternatively, the first support wheel shaft is a rotatable shaft, which rotates along with the first support wheel about the first support wheel axis.

The harvester header support according to the invention further comprises a coupling device. The coupling device is adapted to couple the first support wheel to the frame. The coupling device comprises a first coupling element and a second coupling element. The first coupling element is connected to the first support wheel shaft, and the second coupling element is connected to the frame and to the first coupling element.

The first and second coupling element are pivotable relative to each other over a pivot angle and about a first pivot axis. The first pivot axis extends at a distance from the first support wheel axis. The first pivot axis extends substantially parallel to the first support wheel axis.

The coupling device has a forward travel mode and a rearward travel mode. In the forward travel mode the first coupling element is in a forward travel position relative to the second coupling element. In the rearward travel mode the first coupling element is in a rearward travel position relative to the second coupling element. The first coupling element is moveable relative to the second coupling element from the forward travel position to the rearward travel position and/or vice versa by pivoting the first coupling element relative to the second coupling element about the first pivot axis. The forward travel position and the rearward travelling position are different from each other.

Optionally, the second coupling element is integrated in the frame.

Optionally, the first support wheel is pivotable about a secondary pivot axis which extends in a vertical direction.

Optionally, the first support wheel is pivotable about a secondary pivot axis which extends perpendicular to the first support wheel axis.

The arrangement according to the invention allows to use a first support wheel that is not actively turned when the agricultural harvester makes a turn to the left or to the right. For example, a caster wheel can be used which can pivot freely about a vertical axis and/or an axis which is perpendicular to the first support wheel axis, e.g. pivot freely about a vertical axis, optionally over a limited pivot angle which is less than 180° to the left and right. This simplifies the construction of the harvester header support significantly.

The coupling device according to the invention allows the first support wheel, which is for example a caster wheel, to switch between a forward travel position and a rearward travel position without pivoting over 180° about a vertical axis and/or an axis which is perpendicular to the first support wheel axis. This reduces the amount of space that has to be available for the harvester header support under the agricultural harvester. In some configurations, it is even possible to apply a double support wheel in the harvester header support.

The words "forward", "rearward", "front" and "rear" are related to the main driving direction to the agricultural harvester. "Forward" refers to the main driving direction of the agricultural harvester, which is straight ahead. "Rearward" is the opposite direction.

In the harvester header support, the words "forward", "rearward", "front" and "rear" are related to the main driving direction of an agricultural harvester which comprises the harvester header support according to the invention. For example, a front part of the harvester header support is a part which is in front when the harvester header support is arranged on an agricultural harvester.

"Moving the first coupling element relative to the second coupling element" includes moving the first coupling element and at the same time keeping the second coupling element stationary, moving the second coupling element and at the same time keeping the first coupling element stationary and moving the first coupling element and the second coupling element relative to each other simultaneously.

In a possible embodiment, the harvester header support further comprises a second support wheel, in addition to the first support wheel. Preferably, the second support wheel is rotatable about the first support wheel axis, so about the same axis as the first support wheel. Alternatively, the second support wheel is rotatable about a separate second support wheel axis.

Optionally, the second support wheel is mounted onto the first support wheel shaft. Alternatively, the second support wheel is mounted on a separate second support wheel shaft. The second support wheel is for example rotatable about the first or second support wheel shaft. Alternatively, the first or second support wheel shaft may rotate along with the second support wheel.

Optionally, the second support wheel is pivotable about a secondary pivot axis which extends in a vertical direction.

Optionally, the second support wheel is pivotable about a secondary pivot axis which extends perpendicular to the second support wheel axis.

Optionally, both the first support wheel and the second support wheel are pivotable about the same secondary pivot axis.

In a possible embodiment, when the coupling device is in the forward travel mode, the first support wheel axis is arranged behind the first pivot axis.

In a possible embodiment, when the coupling device is in the rearward travel mode, the first support wheel axis is arranged in front of the first pivot axis.

In a possible embodiment, when the coupling device is in the forward travel mode, the first support wheel axis is arranged behind the first pivot axis and when the coupling device is in the rearward travel mode, the first support wheel axis is arranged in front of the first pivot axis.

The words "in front of" and "behind" are related to the main driving direction of an agricultural harvester which comprises the harvester header support according to the invention. For example, if the harvester header support is seen from a side view in which the main driving direction of the agricultural vehicle is to the right, then "behind" means "on the left side of" and "in front of" means "on the right side of". Even though the rearward travel mode might be intended for driving rearward, in this example to the left, in front of means on the right side of.

In these embodiments, in use the first support wheels reliably follows the steering movements of the agricultural harvester, in particular when the first support wheel is a caster wheel, optionally a caster wheel which is freely rotatable about an axis which is perpendicular to the first support wheel axis. This results in improved stability when in use.

In an embodiment in which a second support wheel is present which is rotatable about a second support wheel axis, optionally the second support wheel axis is arranged behind the first pivot axis when the coupling device is in the forward travel mode.

In an embodiment in which a second support wheel is present which is rotatable about a second support wheel axis, optionally the second support wheel axis is arranged in front of the first pivot axis when the coupling device is in the rearward travel mode.

In an embodiment in which a second support wheel is present which is rotatable about a second support wheel axis, optionally the second support wheel axis is arranged behind the first pivot axis when the coupling device is in the forward travel mode and the second support wheel axis is arranged in front of the first pivot axis when the coupling device is in the rearward travel mode.

In a possible embodiment, the coupling device further comprises a first stop and a second stop. The first stop and second stop define the pivot angle of the coupling device. The first stop is engaged by at least one of the first and the second coupling element when the coupling device is in the forward travel mode. The second stop is engaged by at least one of the first and the second coupling element when the coupling device is in the rearward travel mode.

Optionally, the first stop is engaged by the first coupling element when the coupling device is in the forward travel mode and the second stop is engaged by the first coupling element when the coupling device is in the rearward travel mode.

Optionally, both the first stop and the second stop are arranged on the second coupling element, and the first stop is engaged by the first coupling element when the coupling device is in the forward travel mode and the second stop is engaged by the first coupling element when the coupling device is in the rearward travel mode.

Optionally, both the first stop and the second stop are arranged on the first coupling element, and the first stop is engaged by the second coupling element when the coupling device is in the forward travel mode and the second stop is engaged by the second coupling element when the coupling device is in the rearward travel mode.

In a possible embodiment, the coupling device further comprises a third coupling element. The third coupling element is adapted to allow the first support wheel to pivot relative to the frame about a secondary pivot axis. The secondary pivot axis extends in a substantially vertical direction and/or in a direction perpendicular to the first support wheel axis.

Optionally, the coupling device further comprises a left stop and a right stop, which are adapted to limit the pivoting motion of the first support wheel about the secondary pivot axis.

Optionally, the first support wheel is freely pivotable about the secondary pivot axis.

Optionally, when the coupling device is in the forward travel mode, the first support wheel axis is arranged behind the secondary pivot axis.

Optionally, when the coupling device is in the rearward travel mode, the first support wheel axis is arranged in front of the secondary pivot axis.

Optionally, when the coupling device is in the forward travel mode, the first support wheel axis is arranged behind the secondary pivot axis and when the coupling device is in the rearward travel mode, the first support wheel axis is arranged in front of the secondary pivot axis.

In a variant of the above embodiment, a second support wheel is provided and the third coupling element is adapted to allow both the first support wheel and the second support wheel to pivot relative to the frame about the secondary pivot axis.

Optionally, if the coupling device further comprises a left stop and a right stop, the left stop and right stop are further adapted to limit the pivoting motion of the second support wheel about the secondary pivot axis.

Optionally, the second support wheel is freely pivotable about the secondary pivot axis.

Optionally, the first support wheel and the second support wheel are together freely pivotable about the secondary pivot axis. During the pivoting about the secondary pivot axis, the first support wheel and second support wheel remain in the same position relative to each other.

Optionally, the second support wheel is rotatable about a second support wheel axis and when the coupling device is in the forward travel mode, the second support wheel axis is arranged behind the secondary pivot axis.

Optionally, the second support wheel is rotatable about a second support wheel axis and when the coupling device is in the forward travel mode, the second support wheel axis is arranged in front of the secondary pivot axis.

Optionally, the second support wheel is rotatable about a second support wheel axis and when the coupling device is in the forward travel mode, the second support wheel axis is arranged behind the secondary pivot axis and when the coupling device is in the rearward travel mode, the second support wheel axis is arranged in front of the secondary pivot axis.

In a possible embodiment, the first and second coupling element are movable from the forward travel position towards the rearward travel position and/or vice versa under the influence of friction and/or rolling resistance that occur between the first support wheel (and possibly the second support wheel if a second support wheel is present) and the ground. When the agricultural harvester is driving while the first support wheel is on the ground, the friction and/or rolling resistance between the first support wheel and the ground cause a friction force on the first support wheel in a direction opposite of the direction in which agricultural harvester is driving.

Said friction force is, via the wheel shaft, passed on to the first coupling element. Meanwhile, the second coupling element is subjected to the movement of the agricultural harvester. Thus, the first coupling element is subjected, relatively to the second coupling element, to a resulting force in the opposite direction of the current driving direction.

If the coupling device is in the correct travel position, i.e. the forward travel position if the agricultural harvester is driving forward or the rearward travel position if the agricultural harvester is driving rearward, said resulting force pushes the coupling device even more in the correct travel position or, if the stop is present, against the stop.

However, if the coupling device is not in the correct travel position, said resulting force may cause the first coupling element to pivot about the first pivoting axis relative to the second coupling element, thereby moving the coupling device from the forward travel positions toward the rearward travel position or vice versa. As such, the coupling device can be brought into the correct travel position without any additional action being required by an operator operating the agricultural harvester. This allows to change the driving direction of an agricultural harvester comprising a harvester header support according to this embodiment from forward to rearward relatively easy, which is beneficial to easily and rapidly perform maneuvers requiring the change of driving direction.

The friction and rolling resistance between the first support wheel and the ground are dependent on, among others, the weight carried by the first support wheel and the friction coefficient between the first support wheel and the ground. Said resulting force between the first and second coupling element may in some cases not be enough to cause the pivoting movement. This could for example occur if the agricultural harvester is on a slope, and not enough weight is carried by the first support wheel, or on certain undergrounds of which the friction coefficient between the underground and the first support wheel is not sufficient to cause the required force.

To compensate for these and other effects, the first support wheel (and possibly the second support wheel if a second support wheel is present) is in a possible embodiment adapted to be brought in a locked position. In the locked position, the rotating about the first support wheel axis by first support wheel is prevented or at least reduced.

Instead of rotating, the first support wheel will now at least partially slide over the underground when the agricultural harvester is driven with the first support wheel on the ground. This causes the friction between the first support wheel and the ground to increase substantially, thereby increases the corresponding resulting force between the first and the second coupling element as well.

The increased resulting force now enables the first coupling element to pivot about the first pivot axis relative to the second coupling element, bringing the coupling device from the forward travel position into the rearward travel position or vice versa. To bring the first support wheel in the locked position, the harvester header support in this embodiment further comprises a locking mechanism. Any suitable locking mechanism known to the skilled person can be used, such as a disc brake, a locking pin, or any other braking mechanism.

In this embodiment, the movement from the forward travel position towards the rearward travel position and/or vice versa can be carried out by bringing the first support wheel in the locked position. The agricultural harvester is than moved in the preferred driving direction, i.e. forward or rearward. The resulting force between the first and second coupling element causes the first coupling element to be pivoted about the first pivot axis relative to the second coupling element, thereby bringing the coupling device in the preferred position, i.e. the forward travel position or the rearward travel position. When the coupling device is in the preferred position, the first support wheel can be brought out of the locked position.

In an embodiment, the first support wheel can be locked in the locked position manually, e.g. by applying a brake or inserting a locking pin.

In an embodiment, the first support wheel can be locked in the locked position automatically, e.g. by applying an automated hydraulic brake. In a further embodiment hereof, the harvester header support comprises sensors that detect whether the coupling device is in the forward travel position or in the rearward travel position. The harvester header support further comprises a harvester header support control system. The harvester header support control system is adapted to bring the first support wheel in the locked position when required. As an example, the agricultural harvester may start driving rearward while the coupling device is in the forward travel position. Preferably, the first coupling element will pivot about the first pivot axis relative to the second pivoting element under the influence of the force caused by the friction and/or rolling resistance between the first support wheel and the ground, thereby bringing the coupling device in the rearward travel position. Possibly, said force is insufficient therefor. The harvester header support control system is adapted to receive feedback from the sensors, detecting that the coupling device is not in the correct position. The harvester header support control system is further adapted to then bring the first support wheel in the locked position, e.g. by applying a hydraulic brake, thereby increasing said force and causing the coupling device to be brought into the rearward travel position. The harvester header support will then bring the first support wheel out of the locked position, e.g. by releasing the hydraulic brake. A similar method can be applied to move the coupling device from the rearward travel position to the forward travel position.

In a possible embodiment, the first and second coupling element are movable from the forward travel position towards the rearward travel position and/or vice versa under the influence of gravity.

This allows to further simplify the construction.

In this embodiment, the movement from the forward travel position towards the rearward travel position and/or vice versa can be carried out by lifting the first support wheel (and the second support wheel if a second support wheel is present) from the ground and allowing the first coupling element to pivot about the first pivot axis relative to second coupling element. Optionally, a tilting of the header and/or feeder of the agricultural harvester to which the harvester header support is attached during use, can assist in obtaining the desired movement.

The first coupling element optionally is moved from the forward travel position completely into the rearward travel position and/or vice versa under the influence of gravity.

Alternatively, the first coupling element is moved from the forward travel position towards the rearward travel position into an intermediate position between the forward travel position and the rearward travel position. Then, the first support wheel is lowered onto the ground and the agricultural harvester starts to drive in the rearward direction. Under the influence of the friction between the first support wheel and the ground, the first coupling element is moved from the intermediate position further towards and ultimately into the rearward travel position. Likewise, the first coupling element is moved from the rearward travel position towards the forward travel position into an intermediate position between the rearward travel position and the forward travel position. Then, the first support wheel is lowered onto the ground and the agricultural harvester starts to drive in the forward direction. Under the influence of the friction between the first support wheel and the ground, the first coupling element is moved from the intermediate position further towards and ultimately into the forward travel position.

In a possible embodiment, the coupling device further comprises a lock to lock the first and second coupling element in the forward travel position and/or in the rearward travel position.

This prevents undesired movement of the first coupling element relative to the second coupling element from the forward travel position towards or into the rearward travel position and/or vice versa.

In a possible embodiment, the frame further comprises a first arm and a second arm. The first arm has a coupling side end which is connected to the coupling device and a harvester side end. The second arm has a coupling side end which is connected to the coupling device and a harvester side end. The harvester interface of the frame comprises a first connector and a second connector. The first connector is arranged on the harvester side end of the first arm, and the second connector is arranged on the harvester side end of the second arm.

Optionally, the first connector comprises a plurality of connector elements. Optionally, the second connector comprises a plurality of connector elements.

Optionally, the first connector and/or the second connector are adapted to allow the frame to rotate about a vertical axis relative to the header and/or feeder of the agricultural harvester.

Optionally, the second connector is arranged substantially straight above the coupling device and the first connector is arranged at a higher level than and at a horizontal distance from the coupling device.

Optionally, the first and/or the second connector are provided with a damper.

Optionally, the second arm is provided with a hinge which is arranged between the coupling side end and the harvester side end. This allows to easily drive over limited level variations, like kerbs. Optionally, the frame further comprises a hydraulic cylinder which has a first end that is connected to the second arm, thereby allowing to change the vertical distance between the coupling device and the second connector. This allows to fold the harvester header support away when it is not desired to use it, for example during field operation mode of the agricultural harvester. The agricultural harvester may drive over limited level variations, like kerbs, resulting in vertical displacements of the support wheel. These vertical displacements may at least partially be absorbed by the hydraulic cylinder. As such, the hydraulic cylinder provides a damping effect. To smooth out the corresponding pressure peaks in the hydraulic cylinder, the hydraulic cylinder may be in fluidum connection with a hydraulic accumulator. The hydraulic accumulator functions as a pressure storage reservoir, and helps to smooth out the pulsations in pressure. Any suitable accumulator known to the skilled person may be used.

The invention further pertains to an agricultural harvester comprising a harvester header support according to the invention. The agricultural harvester further comprises a harvester header and a feeder, and the frame of the harvester header support is connected to the header and/or to the feeder via the frame interface.

In a possible embodiment of the agricultural harvester according to the invention, the first support wheel is moveable between a ground engaging position and a retracted position.

Optionally, if a second support wheel is present, the first support wheel and the second support wheel are moveable between a ground engaging position and a retracted position. Optionally, the first support wheel and the second support wheel are simultaneously moveable between a ground engaging position and a retracted position.

This embodiment allows to use the support wheel or support wheels only when necessary or desired, e.g. only when the agricultural harvester is driven over a public road. If the harvester header support is intended to be used only during road transport, the first and optional second support wheel can have a relatively small diameter, so the design of the harvester header support can be compact and it can be rather easily be fitted to the agricultural harvester. If the harvester header support is intended to be used also when the harvester is driven over the field, the diameter of the support wheel or support wheels is preferably somewhat larger to avoid undesired compacting of the soil.

In a possible embodiment of the agricultural harvester according to the invention, the agricultural harvester has a road transport mode and a field operation mode. Optionally, the first support wheel is in a ground engaging position when the agricultural harvester is in the road transport mode.

Optionally, if a second support wheel is present, both the first support wheel and the second support wheel are in a ground engaging position when the agricultural harvester is in the road transport mode.

In a possible embodiment of the agricultural harvester according to the invention, the agricultural harvester comprises front wheels or front tracks. Optionally, the first support wheel of the harvester header support is arranged in front of the front wheels or front tracks when the first support wheel is in a ground engaging position.

Optionally, if a second support wheel is present, both the first support wheel and the second support wheel are arranged in front of the front wheels or front tracks when the first support wheel and the second support wheel are in a ground engaging position.

Arranging the support wheel or support wheels close to the front wheels or front tracks of the agricultural harvester makes that just a small pivot angle over the secondary pivot axis suffices for the support wheel or support wheels to follow the steering movements of the agricultural harvester.

The invention further pertains to a method for operating an agricultural harvester according to the invention, which comprises the following steps:

arranging the first support wheel of the harvester header support on the ground, driving the agricultural harvester in a forward direction, thereby making that the first coupling element is in a forward travel position relative to the second coupling element, stopping the driving of the agricultural harvester, lifting the first support wheel from the ground, arranging the first support wheel of the harvester header support on the ground, driving the agricultural harvester in a rearward direction, thereby making that the first coupling element is in a rearward travel position relative to the second coupling element.

The invention further pertains to a method for operating an agricultural harvester according to the invention, which comprises the following steps:

arranging the first support wheel of the harvester header support on the ground, driving the agricultural harvester in a rearward direction, thereby making that the first coupling element is in a rearward travel position relative to the second coupling element, stopping the driving of the agricultural harvester, lifting the first support wheel from the ground, arranging the first support wheel of the harvester header support on the ground, driving the agricultural harvester in a forward direction, thereby making that the first coupling element is in a forward travel position relative to the second coupling element.

The above described methods for operating an agricultural vehicle require little to no control system or sensors. The harvester header support itself requires little to no control system or sensors as well, since the support wheel is not actively driven or steered. This entails that the harvester header support according to the invention is easy to install, has very few vulnerabilities and requires only a limited amount of maintenance.

Nonetheless, optionally, sensors may be used, e.g. to detect whether the support wheel is the ground engaging position or in the retracted position, and/or to detect whether the coupling device is in the forward travel mode or the rearward travel mode. Any suitable sensors known to the skilled person can be used. The sensors can supply feedback to an operator of the agricultural harvester, e.g. by an indication on a screen or a indication-light. The sensors can also be integrated in a control system that ensures the correct position of the support wheel, by giving feedback on the current position of the support wheel. Such a control system can for example warn the operator, or even stop the agricultural harvester, when the agricultural harvester starts driving rearwards and the coupling device is not in the rearwards travel position. It is further envisaged that the sensors may be adapted to be in communication and/or be integrated in other control systems of the agricultural vehicle or functions of control systems of the agricultural vehicle.

BRIEF DESCRIPTION OF THE DRAWINGS

The invention will be described in more detail below in reference to the figures, in which in a non-limiting manner exemplary embodiments of the invention will be shown. Across the various figures, the same reference numbers have been used to indicate the same features.

In the figures.

DETAILED DESCRIPTION OF THE DRAWINGS

Figure 1:
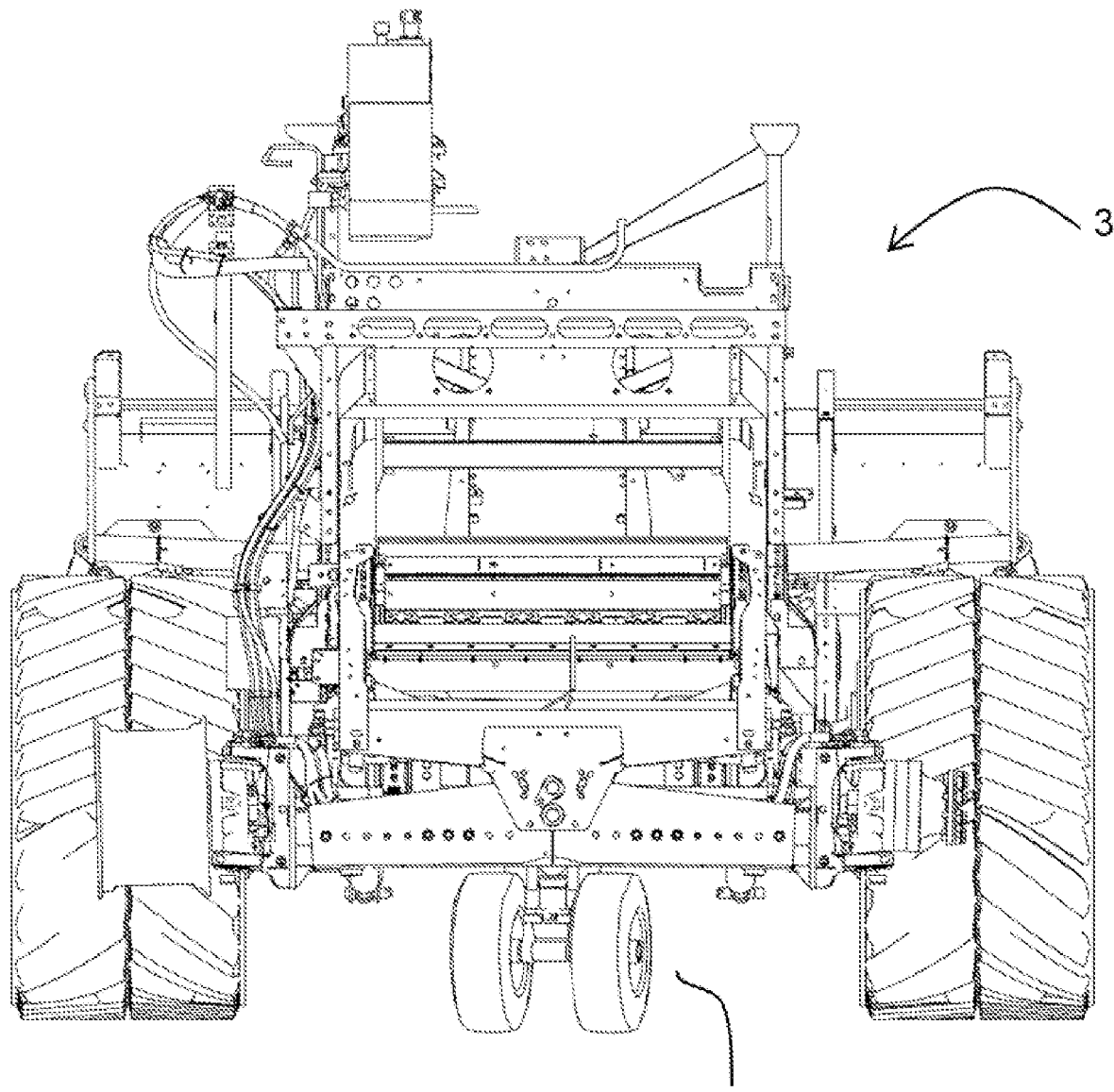
FIG. 1: shows an agricultural harvester comprising a possible embodiment of a harvester header support according to the invention

FIG. 1 shows an agricultural harvester 3 comprising a possible embodiment of a harvester header support 1 according to the invention. During harvesting the agricultural vehicle comprises a header 2 (shown in FIG. 4*a* and FIG. 4*b*), which may be used to harvest crop such as corn or grain. The agricultural harvester 3 has a main driving direction 44, i.e. the forward driving direction. In FIG. 1, the main driving direction 44 of the agricultural harvester 2 is out of the paper, towards the reader. During harvesting, the agricultural harvester 3 can further comprise a feeder 32 (shown in FIG. 4 and FIG. 4*b*). One object of the harvester header support 1 is to carry at least part of the weight of the header 2 and/or feeder 32, thereby reducing the load on the front axle of the agricultural harvester 3.

Figure 2A:
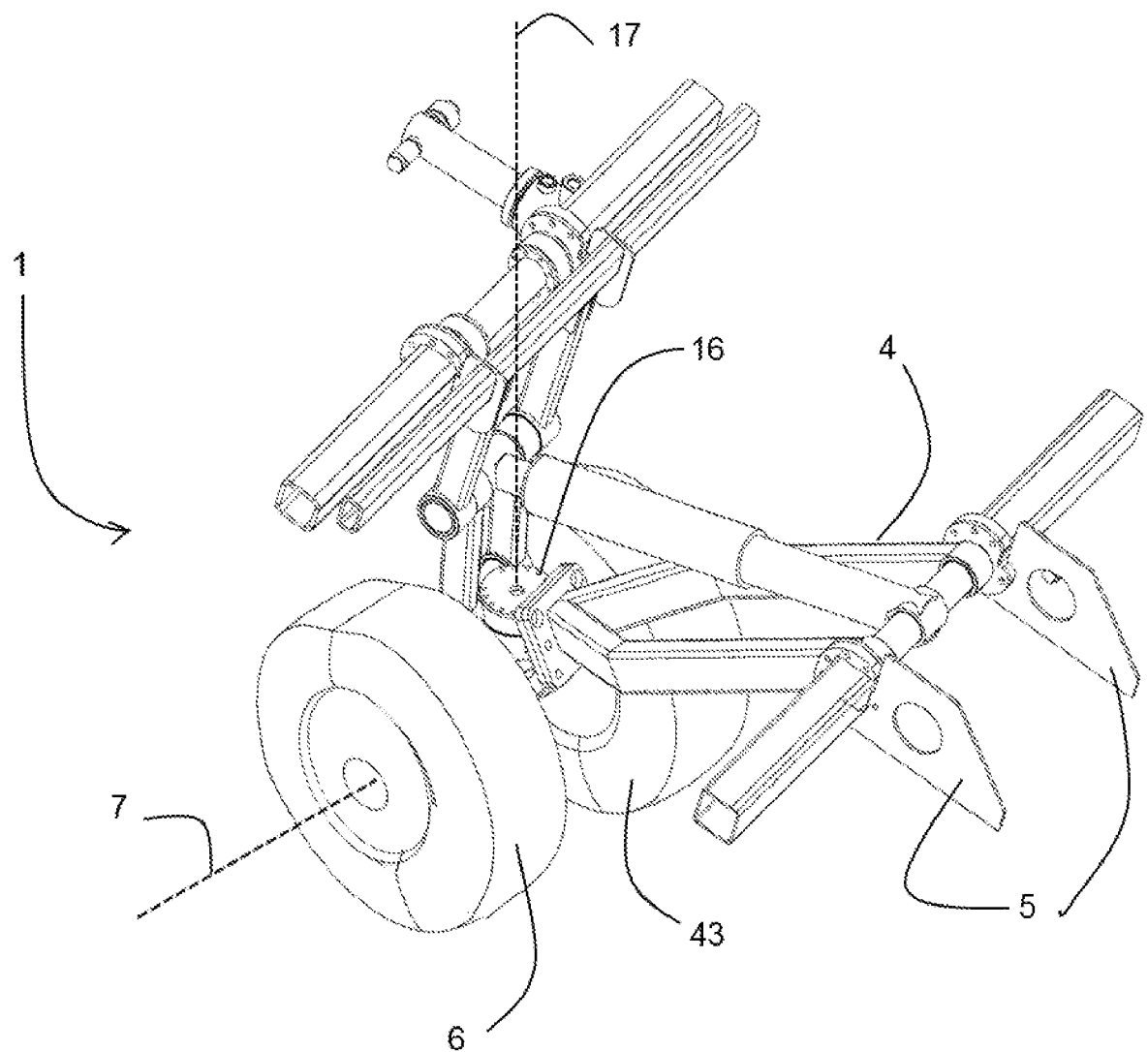
FIG. 2*a*-2*b*: show a possible embodiment of a harvester header support according to the invention
Figure 2B:
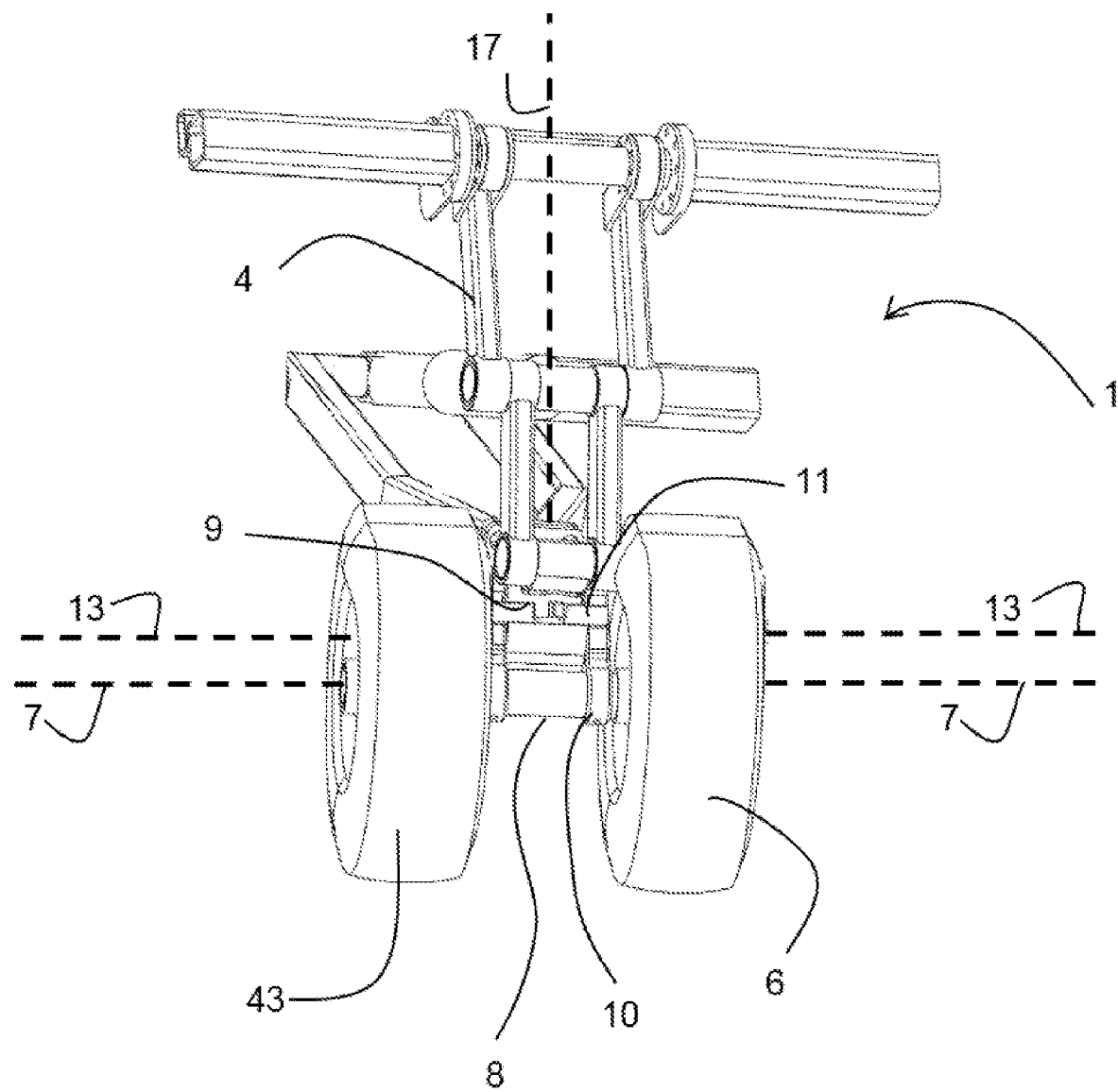

FIG. 2*a* and FIG. 2*b* show two views of a possible embodiment harvester header support 1 according to the invention. The harvester header support 1 comprises a frame 4. The frame 4 comprises a harvester interface 5, which is connectable to an agricultural harvester 3, for example to the header 2 and/or to the feeder 32 of the agricultural harvester 3. The harvester header support 1 further comprises a first support wheel 6, which is rotatable about a first support wheel axis 7. The first support wheel 6 is mounted on a first support wheel shaft 8. The first support wheel shaft 8 is a stationary shaft about which the first support wheel 6 rotates. The harvester header support 1 in FIG. 2a and FIG. 2b further comprises a second support wheel 43. In alternative embodiments, the harvester header support 1 may only be equipped with the first support wheel 6. The second support wheel 43 is rotatable about the first support wheel axis 7, so about the same axis as the first support wheel 6, and the second support wheel 43 is mounted onto the first support wheel shaft 8.

The harvester header 1 further comprises a coupling device 9. The coupling device 9 is adapted to couple the support wheels 6,43 to the frame 4. The coupling device 9 comprises a first coupling element 10 and a second coupling element 11. The first coupling element 10 is connected to the first support wheel shaft 8, and the second coupling element 11 is connected to the frame 4 and to the first coupling element 10.

The first coupling element 10 and second coupling element 11 are pivotable relative to each other over a pivot angle and about a first pivot axis 13. The first pivot axis 13 extends at a distance from the first support wheel axis 7. The first pivot axis 13 extends substantially parallel to the first support wheel axis 7.

Figure 3A:
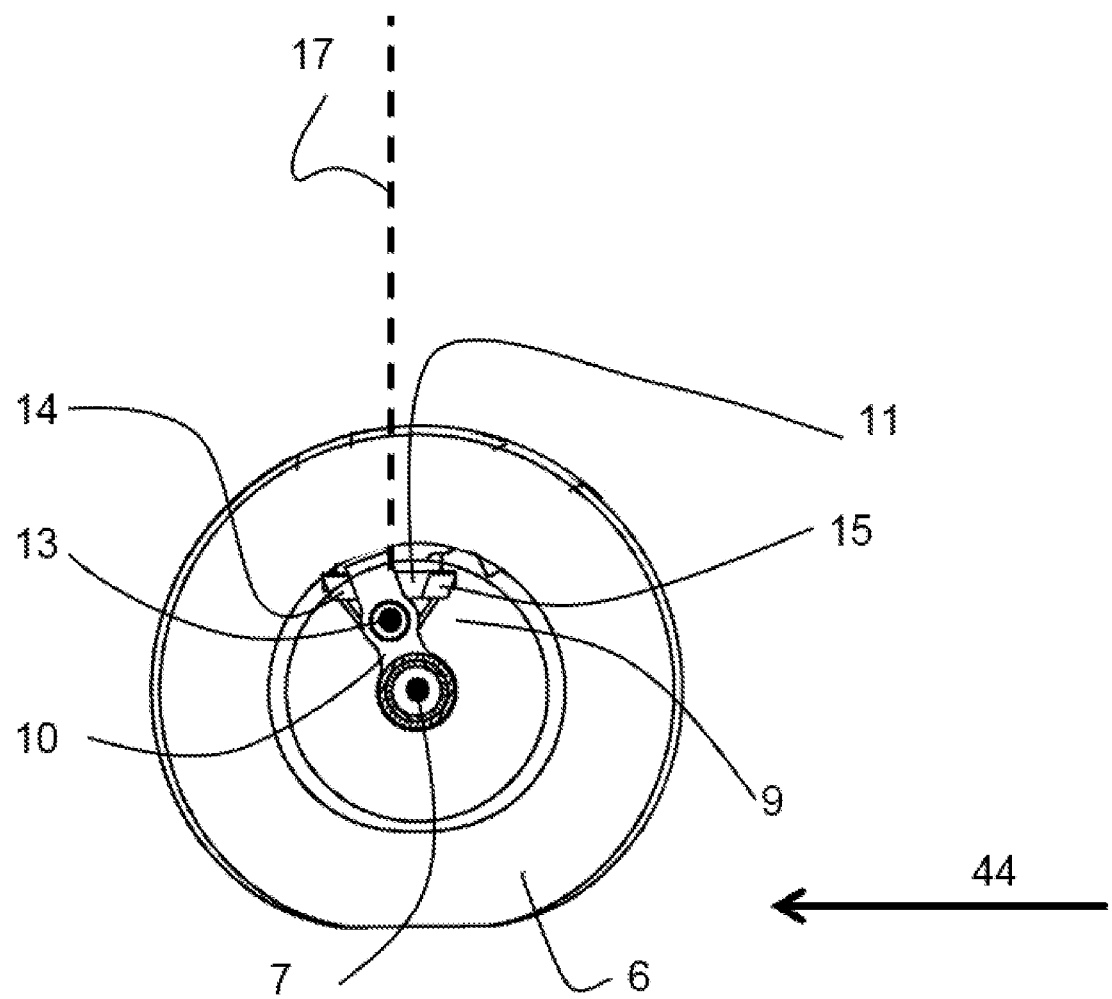
FIG. 3*a*-3*b*: show a side view of a possible embodiment of a coupling device of a harvester header support according to the invention
Figure 3B:
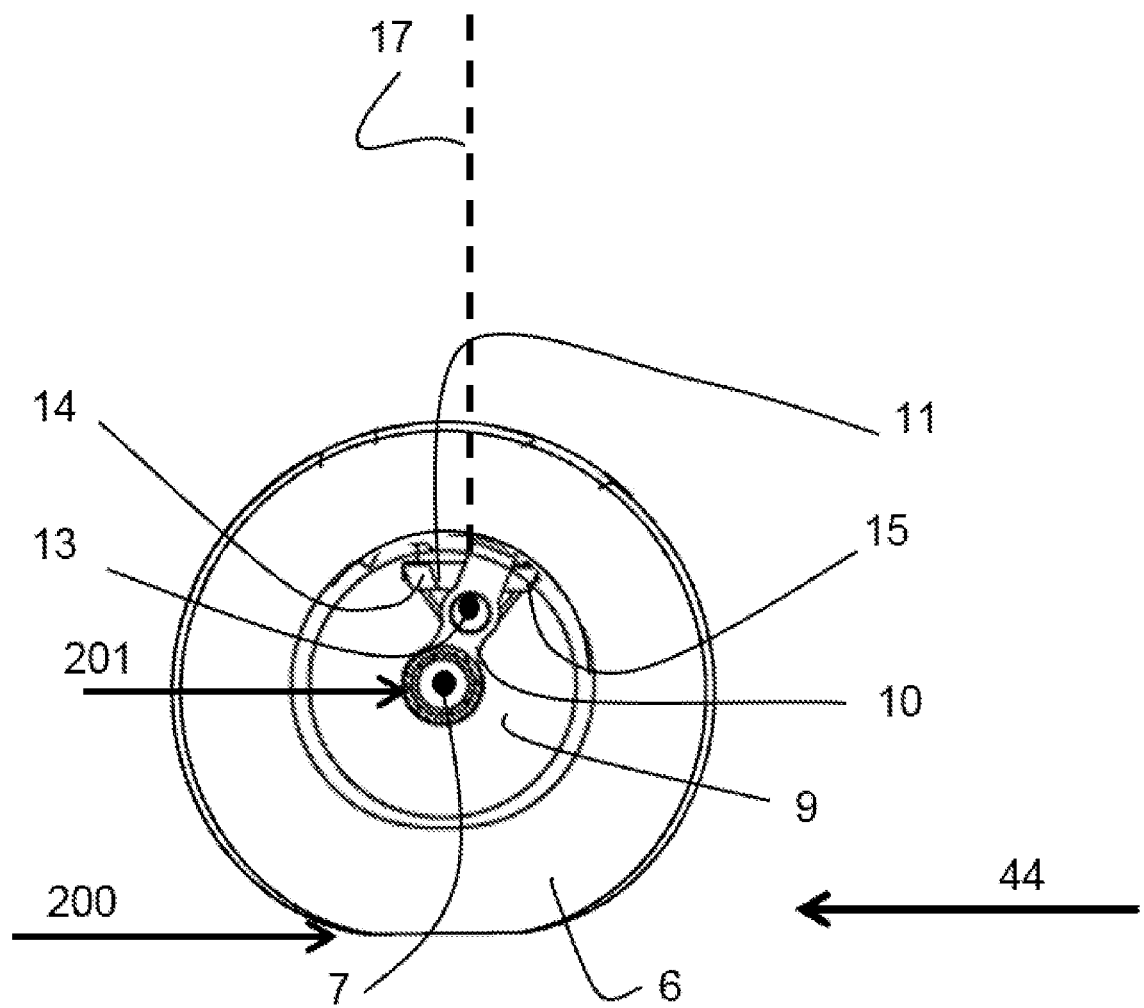

FIG. 3a and FIG. 3b show a closer side view of a possible embodiment of the coupling device 9. In practice, the coupling device 9 may be hidden behind the first support wheel 6. For clarity reasons, the coupling device 9 has been made visible in FIG. 3a and FIG. 3b. The first pivot axis 13 and the first support wheel axis 7 extend perpendicular to the paper in FIG. 3a and FIG. 3b. The coupling device 9 has a forward travel mode, as shown in FIG. 3a and a rearward travel mode, as shown in FIG. 3b. In the forward travel mode the first coupling element 10 is in a forward travel position relative to the second coupling element 11. In the rearward travel mode the first coupling element 10 is in a rearward travel position relative to the second coupling element 11. The first coupling element 10 is moveable relative to the second coupling element 11 from the forward travel position to the rearward travel position and/or vice versa by pivoting the first coupling element 10 relative to the second coupling element 11 about the first pivot axis 13. As can be seen in the figures, the forward travel position and the rearward travelling position are different from each other.

The coupling device 9 allows the support wheels 6,43 to switch between a forward travel position and a rearward travel position without pivoting over 180° about a vertical axis and/or an axis which is perpendicular to the first support wheel axis 7. This reduces the amount of space that has to be available for the harvester header support 1 under the agricultural harvester 3.

When the coupling device 9 of is in the forward travel mode, the first support wheel axis 7 is arranged behind the first pivot axis 13, as can be seen in FIG. 3a and when the coupling device 9 is in the rearward travel mode, the first support wheel axis 7 is arranged in front of the first pivot axis 13, as can be seen in FIG. 3b.

The words "in front of" and "behind" are related to the main driving direction 44 of an agricultural harvester 3 which comprises the harvester header support 1 according to the invention, not the current driving direction of said harvester 3. Thus, in FIG. 3a and FIG. 3b, in front of corresponds with on the left of, and behind corresponds with to the right of.

This optional feature causes in use the support wheels 6,43 to reliably follow the steering movements of the agricultural harvester 3, in particular when the support wheels 6,43 are caster wheels, in particular a caster wheel which is freely rotatable about an axis which is perpendicular to the first support wheel axis 7. Thus, this results in improved stability during driving.

In the embodiment of FIGS. 3a and 3b, the coupling device 9 further comprises a first stop 14 and a second stop 15. The first stop 14 and second stop 15 define the pivot angle over which the coupling device 9 can pivot. Both the first stop 14 and the second stop 15 are arranged on the second coupling element 11. The first stop 14 is engaged by the first coupling element 10 when the coupling device 9 is in the forward travel mode, as is shown in FIG. 3a and the second stop 15 is engaged by the first coupling element 10 when the coupling device 9 is in the rearward travel mode, as is shown in FIG. 3b. In an alternative embodiment, the first stop 14 and the second stop 15 could be arranged on the first coupling element 10 and be engaged by the second coupling element 11.

The coupling device 9 further optionally comprises a lock (not shown) to lock the first coupling element 10 and second coupling element 11 in the forward travel position and/or in the rearward travel position.

The coupling device 9 further comprises a third coupling element 16, which is best visible in FIG. 2a. The third coupling element 16 is adapted to allow the support wheels 6,43 to pivot relative to the frame 4 about a secondary pivot axis 17. The secondary pivot axis 17 extends in a substantially vertical direction and in a direction perpendicular to the first support wheel axis 7. By pivoting about the secondary pivot axis 17, the supports wheels 6,43 are able to follow the agricultural harvester 3 during a steering movement. The support wheels 6,43 are freely pivotable about the secondary pivot axis 17.

Alternatively, the coupling device 9 could further comprises a left stop (not shown) and a right stop (not shown), which are adapted to limit the pivoting motion of the support wheels 6,43 about the secondary pivot axis 17.

As is visible in FIG. 3a and FIG. 3b, when the coupling device 9 is in the forward travel mode, the first support wheel axis 7 is arranged behind the secondary pivot axis 17 and when the coupling device 9 is in the rearward travel mode, the first support wheel axis 7 is arranged in front of the secondary pivot axis 17.

Figure 4A:
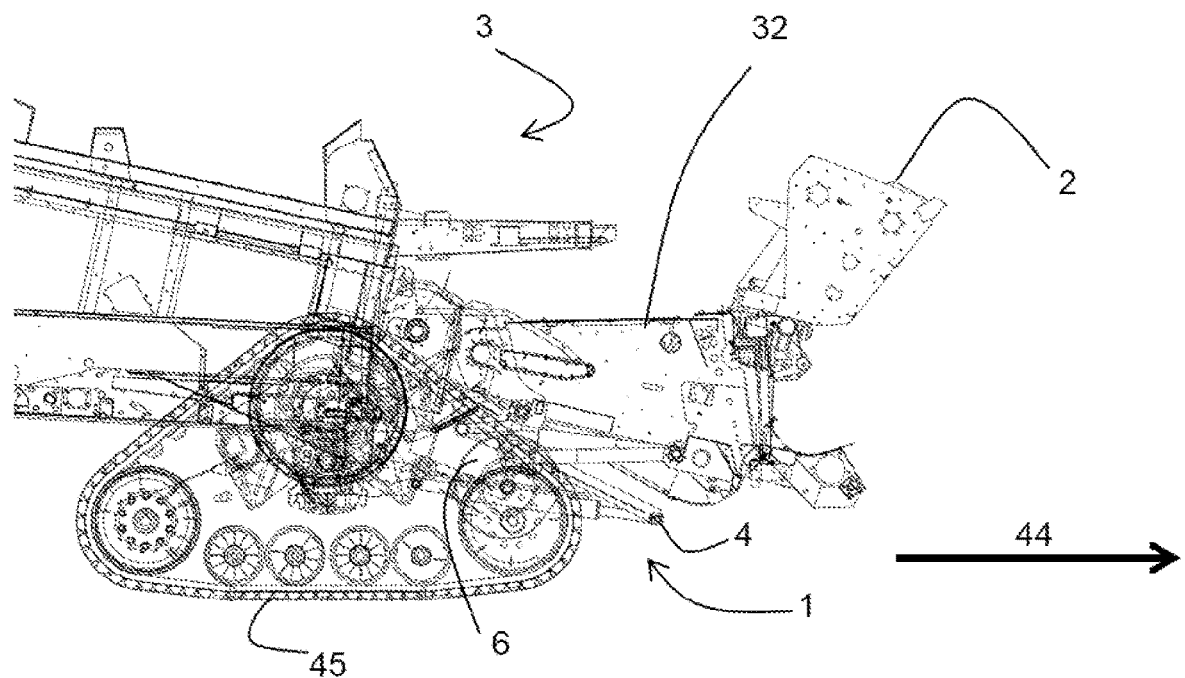
FIG. 4*a*-4*b*: shows an agricultural harvester comprising a possible embodiment of a harvester header support according to the invention in road transport mode and in field operation mode
Figure 4B:
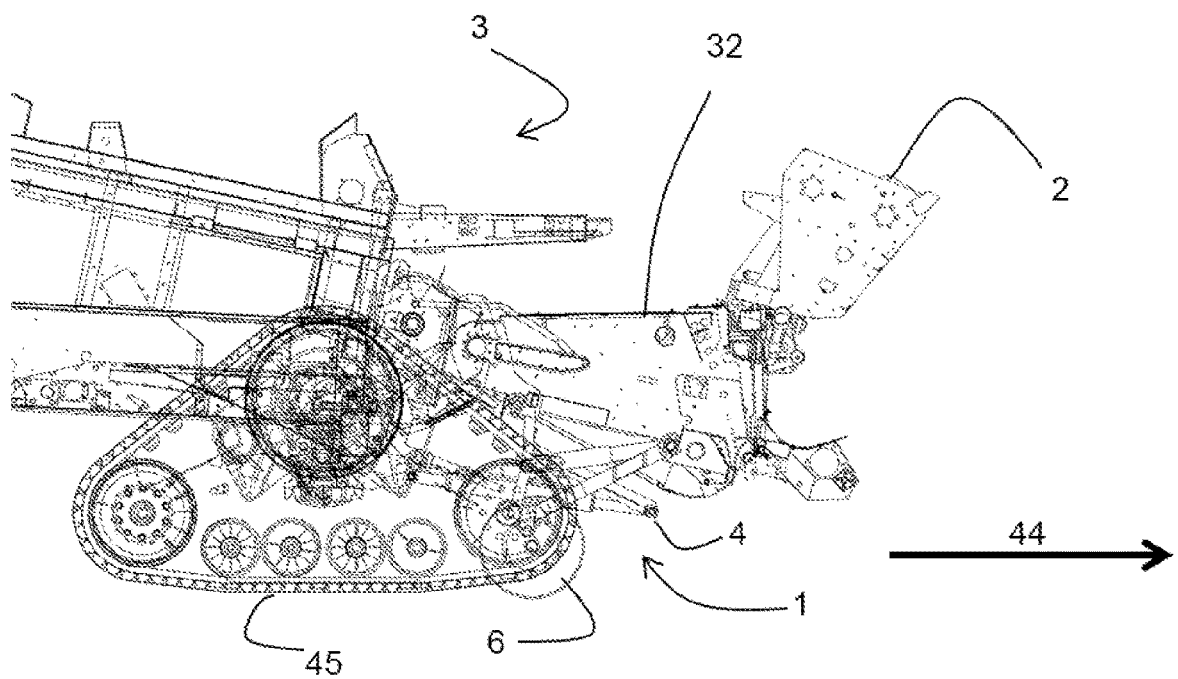

FIG. 4a and FIG. 4b show an agricultural harvester 3 comprising a possible embodiment of a harvester header support 1 according to the invention. The agricultural harvester 3 further comprises a harvester header and a feeder 32, and the frame 4 of the harvester header support 1 is connected to the header and/or to the feeder 32 via the frame interface 5 (not shown in FIG. 4a and FIG. 4b). The support wheels 6,43 are moveable between a ground engaging position, shown in FIG. 4a, and a retracted position, shown in FIG. 4b. This allows to use the support wheels 6,43 only when necessary or desired, e.g. only when the agricultural harvester 3 is driven over a public road.

The agricultural harvester 3 has a road transport mode and a field operation mode. The first support wheel 6 is in a ground engaging position when the agricultural harvester 3 is in the road transport mode. In the present embodiment, where a second support wheel 43 is present, both the first support wheel 6 and the second support wheel 43 are in a ground engaging position when the agricultural harvester 3 is in the road transport mode.

The agricultural harvester 3 shown in FIG. 4a and FIG. 4b comprises front tracks 45. Alternatively, the agricultural vehicle could comprise front wheels. The support wheels 6,43 of the harvester header support 1 are arranged in front of the front wheels or front tracks 45 when the support wheels 6,43 are in a ground engaging position.

Arranging the support wheel or support wheels close to the front wheels or front tracks 45 of the agricultural harvester 3, for example within 1 meter of the axle of the front wheels, makes that just a small pivot angle over the secondary pivot axis 17 suffices for the support wheels 6,43 to follow the steering movements of the agricultural harvester 3.

Figure 5A:
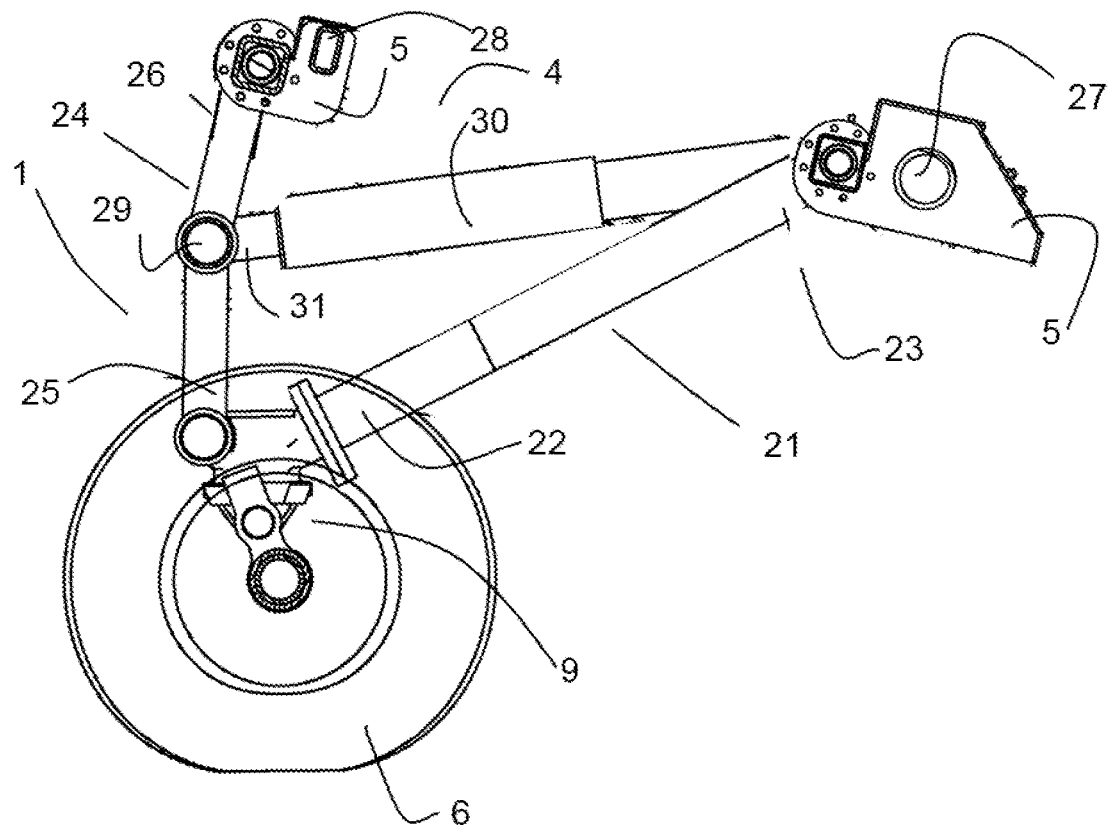
FIG. 5*a*-5*b*: shows a possible embodiment of a harvester header support according to the invention in unfolded and in folded position
Figure 5B:
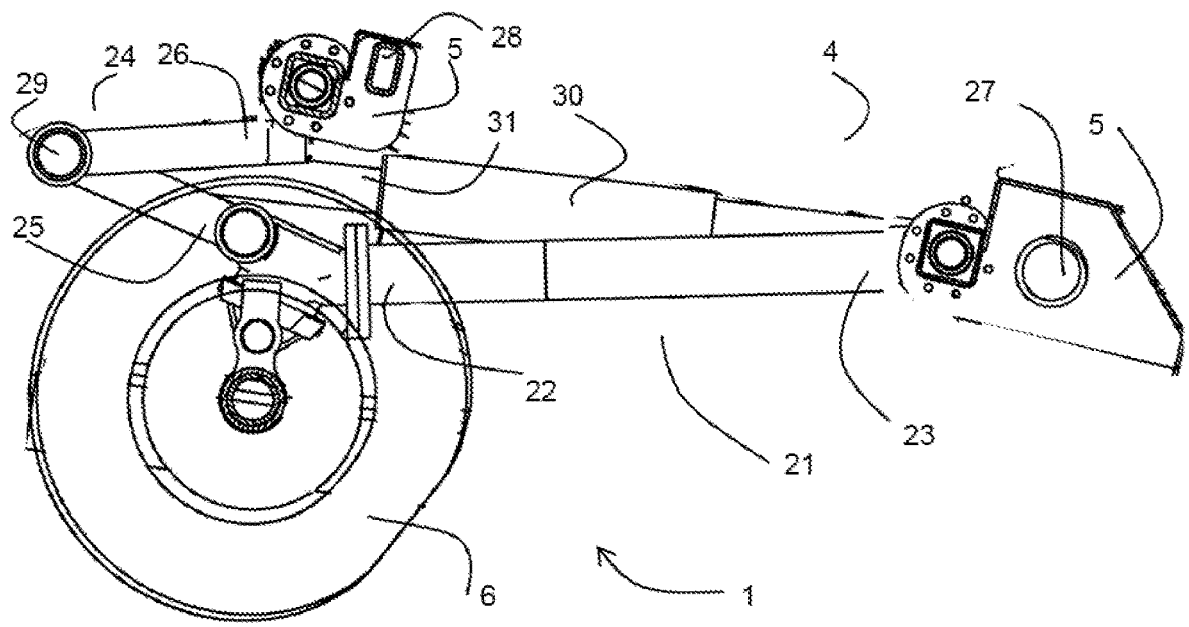

FIG. 5a and FIG. 5b show a possible embodiment of the harvester header support 1 in unfolded and folded position respectively. In this embodiment, the frame 4 comprises a first arm 21 and a second arm 24. The first arm 21 has a coupling side end 22 which is connected to the coupling device 9 and a harvester side end 23. The second arm 24 has a coupling side end 25 which is connected to the coupling device 9 and a harvester side end 26. The harvester interface 5 of the frame 4 comprises a first connector 27 and a second connector 28. The first connector 27 is arranged on the harvester side end 23 of the first arm 21, and the second connector 28 is arranged on the harvester side end 26 of the second arm 24. The second connector 28 is arranged substantially straight above the coupling device 9 and the first connector 27 is arranged at a higher level than and at a horizontal distance from the coupling device 9.

The second arm 24 is provided with a hinge 29 which is arranged between the coupling side end 25 and the harvester side end 26. The hinge 29 makes it possible for the coupling side end 25 to move relative to the harvester side end 26. This allows to easily drive over limited level variations, like kerbs. When driving over such a level variation, at least a part of the vertical movement can be overcome by the movement of the coupling side end 25 relative to the harvester side end 26 of the second arm 24.

The frame 4 further comprises a hydraulic cylinder 30 which has a first end 31 that is connected to the second arm 24, thereby allowing to change the vertical distance between the coupling device 9 and the second connector 28. This allows to fold the harvester header support 1 away when it is not desired to use it, for example during field operation mode of the agricultural harvester 3. By expanding the hydraulic cylinder 30, and thereby engaging the hinge 29, the first support wheel 6 can be lifted, as is shown in FIG. 4b. As such, the harvester header support can be folded. The position of the harvester header support 1 in FIG. 5a corresponds with the position shown in FIG. 4a, while the position of the harvester header support 1 in FIG. 5b corresponds with the position shown in FIG. 4b.

The hydraulic cylinder 30 further provides a damping effect when the agricultural harvester 3 drives over vertical variations, such as kerbs. To smooth out the corresponding pressure peaks in the hydraulic cylinder 30, the hydraulic cylinder 30r may be in fluidum connection with a hydraulic accumulator (not shown). The hydraulic accumulator functions as a pressure storage reservoir, and helps to smooth out the pulsations in pressure.

The agricultural vehicle 3 comprising the harvester header support 1, can be operated to switch from driving forward to driving rearward, and vice versa, in a simple way. Assuming it is desired to drive the agricultural vehicle 3 on the road in a forward direction, corresponding with the main driving direction 44. To drive on the road, the agricultural vehicle will be put in road transport mode, and the support wheels 6,43 will be in the ground engaging position, and thus be arranged on the ground. By driving the agricultural vehicle 3 in a forward direction, friction between the road and the support wheel 6,43 results in a force in opposite direction of the main driving direction 44 to which the support wheels 6,43 are subjected. As such, the first coupling element 10 is put in the forward travel position relative to the second coupling element 11. The coupling device 1 is now in the situation shown in FIG. 3a, the frame 4 is in the situation shown in FIG. 5a, and the agricultural harvester 3 is in the situation shown in FIG. 4a. The weight of the header 2, which is at least partly carried by the harvester header support 1, will force the first coupling element 10 and the second coupling element 11 to stay in this position. In order to change the driving direction from forward to rearward, the agricultural vehicle 3 can be stopped, and the support wheel 6,43 can be lifted from the ground. By lifting the first support wheel from the ground, the weight of the header 2 is no longer carried by the harvester header support 1, and the first coupling element 10 is able to be pivoted relative to the second coupling element 11. The support wheels 6,43 can now be arranged on the ground again. By driving the agricultural harvester 3 in a rearward direction, friction between the road and the support wheels 6,43 results in a force in parallel direction of the main driving direction 44 to which the first support wheel is subjected. As such, the first coupling element 10 is put in a rearward travel position relative to the second coupling element 11. The harvester header support 1 is now in the situation shown in FIG. 3b. In a similar way, the agricultural harvester 3 can change from driving rearward to driving forward.

The agricultural vehicle 3 comprising the harvester header support 1, could also be operated to switch from driving forward to driving rearward, and vice versa, under the influence of friction and/or rolling resistance that occur between the support wheels 6,43 and the ground.

This will be further explained with reference to FIG. 3b. In this figure, the coupling device 9 is in the rearward travel position. Assuming now that the agricultural harvester drives forward, thus in the main driving direction 44. The first support wheel 6 is subjected to a friction force 200, in a direction opposite to the main driving direction 44. Although the second support wheel 43 is subjected to a similar friction force, the explanation will be limited to the first support wheel 6 for simplicity.

The friction force 200 is, via the first support wheel shaft 8, passed on to the first coupling element 10. Meanwhile, the second coupling element 11 is subjected to the movement of the agricultural harvester 3, in the main driving direction 44. This results in a resulting force 201 between the first coupling element 10 and the second coupling element 11. The resulting force 201 causes the first coupling element 10 to pivot about the first pivoting axis 13 relative to the second coupling element 11. As such, the coupling device 9 is moved from the rearward travel position to the forward travel position.

Assuming now that the resulting force 201 would be insufficient to cause said pivoting. The first support wheel 6 can be brought into a locked position, wherein the rotating of the first support wheel 6 is prevented or at least reduced. The first support wheel 6 can be brought into the locked position by applying a disc brake (not shown). In the locked position the first support wheel 6 will slide over the ground rather than roll over it. This causes an increase in the friction force 200, thereby causing an increase in the corresponding resulting force 201. As such, the resulting force 201 is now sufficient to cause said pivoting.

In some embodiments, the coupling device 9 has an intermediate position between the forward travel position and the rearward travel position. In those embodiments, the coupling device 9 can be put in said intermediate position before driving the agricultural harvester 3. As a result of the friction between the ground and the support wheels 6,43, the coupling device 9 will automatically be brought into the desired position, i.e. forward or rearward travel position, as soon as the agricultural harvester 3 moves forward or rearward.

Switching the coupling device from one travel position to another, i.e. forward, rearward or intermediate, can be done with the help of gravity, e.g. if the weight of the support wheels 6,43 is carried by the harvester header support 1 during lifting of said support wheels 6,43.

The invention claimed is:

1. A harvester header support for an agricultural harvester, the agricultural harvester comprising a front axle, a feeder, and a harvester header connected to the feeder and configured for harvesting crop from a field, the harvester header support comprising:
   a frame comprising a harvester interface connectable to the feeder or the harvester header in front of the front axle of the agricultural harvester, the frame being configured for supporting at least part of a weight of at least one of the feeder and the harvester header;
   a first support wheel rotatable about a first support wheel axis, the first support wheel mounted on a first support wheel shaft; and
   a coupling device configured to couple the first support wheel to the frame, the coupling device comprising:
      a first coupling element connected to the first support wheel shaft; and
      a second coupling element connected to the frame and to the first coupling element,
   wherein the first and second coupling elements are pivotable relative to each other over a pivot angle and about a first pivot axis extending at a distance from and substantially parallel to the first support wheel axis,
   wherein the coupling device has a forward travel mode and a rearward travel mode,
   wherein, when the coupling device is in the forward travel mode, the first coupling element is in a forward travel position relative to the second coupling element,
   wherein, when the coupling device is in a rearward travel mode, the first coupling element is in a rearward travel position relative to the second coupling element, and
   wherein the first coupling element is moveable from the forward travel position to the rearward travel position or from the rearward travel position to the forward travel position by pivoting the first coupling element relative to the second coupling element about the first pivot axis.

2. The harvester header support according to claim 1, wherein, when the coupling device is in the forward travel mode, the first support wheel axis is arranged behind the first pivot axis.

3. The harvester header support according to claim 1, wherein, when the coupling device is in the rearward travel mode, the first support wheel axis is arranged in front of the first pivot axis.

4. The harvester header support according to claim 1, wherein the coupling device further comprises a first stop and a second stop to define the pivot angle, and wherein the first stop is engaged by at least one of the first coupling element and the second coupling element when the coupling device is in the forward travel mode, and wherein the second stop is engaged by at least one of the first coupling element and the second coupling element when the coupling device is in the rearward travel mode.

5. The harvester header support according to claim 1, wherein the coupling device further comprises a third coupling element configured to allow the first support wheel to pivot relative to the frame about a secondary pivot axis extending in a substantially vertical direction.

6. The harvester header support according to claim 5, wherein the coupling device further comprises a left stop and a right stop, wherein both of the left stop and the right stop are configured to limit the pivoting of the first support wheel about the secondary pivot axis.

7. The harvester header support according to claim 5, wherein the first support wheel is freely pivotable about the secondary pivot axis.

8. The harvester header support according to claim 5, wherein, when the coupling device is in the forward travel mode, the first support wheel axis is arranged behind the secondary pivot axis, and wherein, when the coupling device is in the rearward travel mode, the first support wheel axis is arranged in front of the secondary pivot axis.

9. The harvester header support according to claim 1, wherein the first and second coupling elements are movable from the forward travel position towards the rearward travel position and from the rearward travel position towards the forward travel position under influence of gravity.

10. The harvester header support according to claim 1, wherein the coupling device further comprises a lock to lock the first and second coupling elements in the forward travel position or in the rearward travel position.

11. The harvester header support according to claim 1, wherein the frame further comprises:
    a first arm having a coupling side end which is connected to the coupling device and a harvester side end, and
    a second arm having a coupling side end which is connected to the coupling device and a harvester side end, and
    wherein the harvester interface of the frame comprises:
       a first connector arranged on the harvester side end of the first arm, and
       a second connector arranged on the harvester side end of the second arm.

12. The harvester header support according to claim 11, wherein the second arm comprises a hinge which is arranged between the coupling side end and the harvester side end, and
    wherein the frame further comprises a hydraulic cylinder which has a first end that is connected to the second arm, thereby allowing a vertical distance between the coupling device and the second connector to change.

13. An agricultural harvester comprising:
    a front axle;
    a feeder;
    a harvester header connected to the feeder and configured for harvesting crop from a field; and
    a harvester header support comprising:
       a frame comprising a harvester interface connected to the feeder or the harvester header in front of the front axle of the agricultural harvester, the frame supporting at least part of a weight of at least one of the feeder and the harvester header;
       a first support wheel rotatable about a first support wheel axis, the first support wheel mounted on a first support wheel shaft; and
       a coupling device configured to couple the first support wheel to the frame, the coupling device comprising:
          a first coupling element connected to the first support wheel shaft; and a second coupling element connected to the frame and to the first coupling element, wherein the first and second coupling elements are pivotable relative to each other over a pivot angle and about a first pivot axis extending at a distance from and substantially parallel to the first support wheel axis, wherein the coupling device has a forward travel mode and a rearward travel mode, wherein, when the coupling device is in the forward travel mode, the first coupling element is in a forward travel position relative to the second coupling element, wherein, when the coupling device is in a rearward travel mode, the first coupling element is in a rearward travel position relative to the second coupling element, and wherein the first coupling element is moveable from the forward travel position to the rearward travel position or from the rearward travel position to the forward travel position by pivoting the first coupling element relative to the second coupling element about the first pivot axis.

14. The agricultural harvester according to claim 13, wherein the first support wheel is moveable between a ground engaging position and a retracted position.

15. The agricultural harvester according to claim 13, wherein the agricultural harvester has a road transport mode and a field operation mode, and wherein the first support wheel is in a ground engaging position when the agricultural harvester is in the road transport mode.

16. The agricultural harvester according to claim 13, wherein the agricultural harvester comprises front wheels or front tracks, and wherein the first support wheel of the harvester header support is arranged in front of the front wheels or front tracks.

17. A method for operating an agricultural harvester, comprising:

providing a harvester header support comprising a frame comprising a harvester interface configured for connecting to the agricultural harvester, a first support wheel rotatable about a first support wheel axis, the first support wheel mounted on a first support wheel shaft, and a coupling device configured to couple the first support wheel to the frame, the coupling device comprising a first coupling element connected to the first support wheel shaft, and a second coupling element connected to the frame and to the first coupling element;

arranging the first support wheel of the harvester header support on the ground;

driving the agricultural harvester in a forward direction, such that the first coupling element is in a forward travel position relative to the second coupling element;

stopping the driving of the agricultural harvester;

lifting the first support wheel from the ground;

arranging the first support wheel of the harvester header support on the ground; and driving the agricultural harvester in a rearward direction, such that the first coupling element is in a rearward travel position relative to the second coupling element.

18. The method according to claim 17, further comprising steps of:

bringing the first support wheel of the harvester header support in a locked position;

driving the agricultural harvester in a rearward direction, during which the first support wheel at least partially slides over the underground, thereby causing a friction force on the first support wheel in the forward direction, which friction force causes a resulting force between the first coupling element and the second coupling element, which resulting force causes the first coupling element to pivot about the first pivot axis relative to the second coupling element, bringing the coupling device in the rearward travel position; and bringing the first support wheel of the harvester header support out of the locked position.

\* \* \* \* \*